(12) United States Patent  
Berbert

(10) Patent No.: US 8,679,604 B2  
(45) Date of Patent: Mar. 25, 2014

(54) PEELABLE FILM AND PACKAGE USING SAME

(75) Inventor: Otacilio Teixeira Berbert, Oshkosh, WI (US)

(73) Assignee: Curwood, Inc., Oshkosh, WI (US)

(*) Notice: Subject to any disclaimer, the term of this patent is extended or adjusted under 35 U.S.C. 154(b) by 942 days.

(21) Appl. No.: 12/356,142

(22) Filed: Jan. 20, 2009

(65) Prior Publication Data  
US 2010/0181370 A1 Jul. 22, 2010

(51) Int. Cl.  
B65D 75/52 (2006.01)

(52) U.S. Cl.  
USPC ......... 428/35.7; 428/515; 428/40.1; 428/192; 428/40.6

(58) Field of Classification Search  
USPC .................. 428/34.9, 34.8, 36.9, 36.91, 41.3; 229/87.05  
See application file for complete search history.

(56) References Cited

U.S. PATENT DOCUMENTS

| | | | |
|---|---|---|---|
| 3,497,131 A | 2/1970 | Tracy | |
| 4,074,504 A | 2/1978 | Greenawalt et al. | |
| 4,834,245 A | 5/1989 | Ohga et al. | |
| 4,909,726 A | 3/1990 | Bekele | |
| 5,077,955 A | 1/1992 | Evans | |
| 5,089,073 A | 2/1992 | Schirmer | |
| 5,409,115 A | 4/1995 | Barkhorn | |
| 6,221,410 B1 * | 4/2001 | Ramesh et al. | 426/105 |
| 6,436,499 B1 * | 8/2002 | Krampe et al. | 428/40.1 |
| 6,551,410 B2 | 4/2003 | Crevasse et al. | |
| 6,815,023 B1 * | 11/2004 | Tatarka et al. | 428/34.9 |
| 7,045,183 B2 | 5/2006 | Amano et al. | |
| 7,393,593 B2 | 7/2008 | Roussos | |
| 2002/0172834 A1 * | 11/2002 | Rivett et al. | 428/515 |
| 2004/0166262 A1 | 8/2004 | Busche et al. | |
| 2006/0269707 A1 * | 11/2006 | Berbert | 428/35.7 |
| 2009/0029080 A1 * | 1/2009 | Visioli et al. | 428/34.8 |

FOREIGN PATENT DOCUMENTS

EP 1350741 A2 10/2003  
JP 3029766 A 2/1991

OTHER PUBLICATIONS

"A New Technique for Preparing Low Surface Energy Polymers for Adhesive Bomding" by Hansen, R. H. and Schonhom, H., Polymer Letters, vol. 4, pp. 203-209 (1966).*  
Curwood Technical Bulletin, "Curlam® Grade 6984-C Protective Packaging Film," Jun. 2007, pp. 1.

* cited by examiner

Primary Examiner — Ellen S Raudenbush  
(74) Attorney, Agent, or Firm — Tom J. Hall

(57) ABSTRACT

The present invention is directed to a peelable packaging film comprising a first thermoplastic substrate and a second thermoplastic substrate wherein the packaging film has a Heat Shrinkage value between 0 and 10% at 102° C. in either the machine or transverse directions. The first and second substrates each have a first surface and a second surface. Each of the first surfaces comprises a polyolefin and has a surface energy of at least 36 dynes/cm. At least one first surface is oriented, preferably biaxially oriented, and at least one first surface is non-heat shrinkable. In contact with both first surfaces is a contiguous adhesive layer. A peelable interface is provided between the adhesive layer and at least one of the first surfaces of the substrates. The peelable interface is adapted to have a peelable seal strength of between 60 and 2,500 grams-force/in.

33 Claims, 7 Drawing Sheets

PEELABLE FILM AND PACKAGE USING SAME

FIELD OF THE INVENTION

The present invention relates generally to a packaging film, and more particularly to a peelable packaging film suitable for use in chub packaging applications and having improved physical film properties, and a chub package using same.

BACKGROUND OF THE INVENTION

Certain foods, and particularly meat products such as ground beef and other comminuted food substances, are commonly packaged in what are called chub packages. These packages are generally produced at central processing plants operated by supermarket chains or meat packing companies. These packages are generally produced using a vertical form fill seal (VFFS) process and equipment, in which a tube is formed from a flat web of roll stock. The tube is formed vertically and longitudinally sealed which may include the use of a vertical sealing bar. The longitudinal seal is formed by heat-sealing the overlapping edges of the packaging film as it passes through a sealing device of the VFFS equipment. The heat-sealing process may be accomplished using supersonic sealing, high frequency sealing and a hot-air knife sealing system. Sealing thermoplastic materials by means of a hot-air knife sealing system typically includes supplying a compressed jet of hot air at temperatures of between 120 and 700° C. and at pressures of between 0.4 and 0.8 bar directed towards the zone where the seal is to be formed between the edges of thermoplastic material. The vertical sealing bar then engages the packaging film for a predetermined dwell time to weld the overlapping edges of the packaging film and form a heat seal. A packaging film must have sufficient heat resistance to withstand relatively high temperatures and pressures during sealing process yet can fuse together to produce a reliable, hermetic heat seal. For this reason, packaging films suitable for use with hot-air knife sealing systems are typically non-heat shrinkable films.

With the longitudinally seal formed, the bottom of the tube may then be sealed with a metal clip applied to the bottom of the tube (known as crimping) and a comminuted product pumped into the open end of the tube. The top of the filled tube is then sealed with another metal clip to produce the final chub package. In appearance, these chubs resemble semi-rigid tubes with the tubular web forming a skin tight layer around the food product. Package sizes may range from 1 to 20 pounds, depending on the intended mode of distribution. The equipment typically used to stuff a food and non-food products into the tubular web can produce stress on the entire package, particularly at the crimped ends and along the longitudinal seal of the tube. During the crimping operation, a sharp-edged leg of the metal clip may pierce or tear the packaging web. As a result, the contents of the package leaks through the hole in the packaging web due to the residual pressure in the package produced during the stuffing process. Consequentially, the package product must then be discarded by the manufacturer. Known chub packages will typically include a strong factory heat seal to prevent the longitudinal seam from pulling apart during the stuffing operation, or during the handling and transport of the packaged article. Although a strong heat seal provides protection against unwanted seal failure, it also makes it difficult for the end user to open the package. Accordingly, there is needed an improved chub packaging web having sufficient heat resistance, toughness and/or penetration resistance to withstand the heat-sealing and crimping operations, and which includes a longitudinal seal of sufficient seal strength to survive the stuffing process and handling, yet can be readily opened by application of manual force without requiring use of a knife or cutting implement.

SUMMARY OF THE INVENTION

In a first aspect, a peelable packaging film has a Heat Shrinkage value of less than 10% at 102° C. in either the machine or transverse directions and is thus adapted to withstand a hot-air knife sealing process. The film comprises a first thermoplastic substrate having a first and second surface, a second thermoplastic substrate having a first and second surface, and an adhesive layer disposed between the first surfaces of the substrates. The first surface of each substrate comprises a polyolefin and has a surface energy of at least 36 dynes/cm. At least one of the first surface layers is oriented which provides a peelable interface between the adhesive layer and the oriented surface. The first and second substrates may be a monolayer or multilayer film.

In a second aspect, a peelable packaging film has a Heat Shrinkage value of less than 10% at 102° C. in either the machine or transverse directions and is thus adapted to withstand a hot-air knife sealing process. The film comprises a first thermoplastic substrate having a first and second surface, a second thermoplastic substrate having a first and second surface, and a solvent-based polyurethane adhesive layer disposed between the first surfaces of the substrates. The first surface of each substrate comprises a polyolefin and has a surface energy of at least 36 dynes/cm. At least one of the first surface layers is oriented which provides a peelable interface between the adhesive layer and the oriented surface. The peelable interface has a seal strength value set to a range from 60 to 2,500 grams-force/in. The first and second substrates may be a monolayer or multilayer film. The film has a Slow Rate Penetration Resistance value of greater than 11 Newtons.

In a third aspect, a peelable packaging film has a Heat Shrinkage value of less than 10% at 102° C. in either the machine or transverse directions and is thus adapted to withstand a hot-air knife sealing process. The film comprises a first thermoplastic substrate having a first and second surface, a second thermoplastic substrate having a first and second surface, and an solvent-based polyether polyurethane adhesive layer disposed between the first surfaces of the substrates. The first surface of each substrate comprises a polyolefin and has a surface energy of at least 36 dynes/cm. At least one of the first surface layers is oriented which provides a peelable interface between the adhesive layer and the oriented surface. The peelable interface has a seal strength value set to a range from 60 to 2,500 grams-force/in. The first and second substrates may be a monolayer or multilayer film. The film has a Slow Rate Penetration Resistance value of greater than 11 Newtons. The first substrate provides a first outer packaging film-layer and the second substrate provides a second outer packaging film-layer.

In a fourth aspect, a cylindrically shaped package comprises the peelable film according to first, second or third aspect of the present invention. The package is produced by folding the web onto itself to form an outer package surface comprising the second surface of the first film, joining the overlaying edges together lengthwise to form a longitudinal peelable seal portion and joining the tubular film crosswise to form a first end seal portion and an opposing second end seal portion. The package encloses a comminuted product which may include a food or non-food substance.

DEFINITIONS

"Polymer" herein refers to the product of a polymerization reaction, and is inclusive of homopolymers, copolymers, terpolymers, tetrapolymers, etc.

"Copolymer" herein refers to a polymer formed by the polymerization reaction of at least two different monomers and is inclusive of random copolymers, block copolymers, graft copolymers, etc.

"Thermoplastic" herein refers to a polymeric material that softens when exposed to heat and which substantially returns to a non-softened condition when cooled to room temperature.

"Film" herein refers to plastic web materials having a thickness of 0.50 mm (20 mils) or less such as 0.25 mm (10 mils) or less.

"Seal Strength" values are obtained for five identical samples of a web. The web samples are cut 1 inch (2.54 cm) wide and a suitable length for the test equipment, e.g., about 5 inches (77 cm) long with a 0.25-1 inch (0.635-2.54 cm) wide seal portion centrally and transversely disposed. Opposing end portions of a web sample are secured in opposing clamps in a universal tensile testing instrument. The sample is secured in a taut snug fit between the clamps without stretching prior to beginning the test. The test is conducted at an ambient or room temperatures (RT) (about 23° C.) test temperature. The instrument is activated to pull the sample via the clamps transverse to the seal at a uniform rate of 12.0 inches (30.48 cm) per minute until delamination or rupture of the sample. The test temperature noted and lbs. force at break per inch are measured and recorded. The test is repeated for four additional samples and the average grams per inch at delamination are reported.

"Peelable" and like terminology is used herein to refer to any substrate interface which are engineered to be readily peelable (or delaminate within a particular film layer or between two film layers) without uncontrolled or random tearing or rupturing the packaging materials which may result in premature destruction of the packaging film and package made therefrom. A peelable interface is one that can be manually peeled apart to open a package without resort to a knife or other implement to tear or rupture the web. In the present invention, the peelable layer interface must have a seal strength sufficient to prevent failure of the seal during the normal stuffing process and further normal handling and transport of the packaged article. The seal strength must also be low enough to permit manual opening of the seal. Preferably, parameters such as choice of materials and lamination conditions will be used to adjust the seal strength to the desired level for the particular package web and packaging application. A peelable layer interface according to the present invention has an initial seal strength set to a maximum value of 2,500 grams-force/inch and a peelable seal strength set to a range from 60 to 2,500 grams-force/inch. In contrast, a "non-peelable layer interface" is not adapted to peel apart or delaminate in a controlled manner as described above. Non-peelable layer interfaces have initial seal strengths of at least 2,000 gram-force/inch, typically at least 2,500 gram-force/inch.

"Slow Rate Penetration Resistance" herein refers to the test which permits flexible thermoplastic webs to be characterized for slow rate penetration resistance to a driven probe. The test is performed at room temperature, by applying a biaxial stress at a single test velocity on the material until perforation occurs. The force, energy, and elongation to perforation are determined and reported in units of Newtons. A person having ordinary skill in the art would recognize that Slow Rate Penetration Resistance is a measure of a film's toughness and puncture resistance. A packaging web with a high Slow Rate Penetration Resistance value, relative to an incumbent film, is tougher and more puncture resistant and thus, would be desirable to the packaging industry.

"Heat Shrinkage" values are obtained by measuring unrestrained shrink of a 10 cm. square sample immersed in water at 102° C. (or the indicated temperature if different) for five to ten seconds. Four test specimens are cut from a given sample of the film to be tested. Specimens are cut into squares of 10 cm length (M.D.) by 10 cm. length (T.D.). Each specimen is completely immersed for 5-10 seconds in a 102° C. (or the indicated temperature if different) water bath. The specimen is then removed from the bath and the distance between the ends of the shrunken specimen is measured for both the M.D. and T.D. directions. The difference in the measured distance for the shrunken specimen and each original 10 cm. side is multiplied by ten to obtain percent shrinkage in each direction. The shrinkage of 4 specimens is averaged and the average M.D. and T.D. shrinkage values reported. It should be noted that heat shrinkable films referred to herein are uniaxially or biaxially oriented film. Preferred heat shrinkable films suitable for the present invention have a Heat Shrinkage value of greater than 10% in both machine and transverse directions as measured at 102° C. for 10 minutes. In contrast, preferred non-heat shrinkable films suitable for the present invention have a Heat Shrinkage value of between 0 and 10% in both machine and transverse directions as measured at 102° C. for 10 minutes.

"Oriented" herein refers to a thermoplastic films obtained by either extrusion of one polymer layer, and coextrusion or extrusion coating of polymeric resins of different layers, to obtain a primary film which is quickly cooled to a solid state to quench (stop or slow) crystallization of the polymers, thereby providing a solid film. The solid primary film is then reheated to the so-called orientation temperature, and thereafter biaxially stretched at the orientation temperature using either a tubular solid-state orientation process (for example a trapped bubble method) or using a flat solid-state orientation process (for example a simultaneous or sequential tenter frame), and finally rapidly cooled below the orientation temperature to provide a heat shrinkable film. In the trapped bubble solid state orientation process, the primary film is stretched in the transverse direction (TD) by passing over an air bubble which is held between two rotating nip rolls, as well as stretched in the longitudinal direction (LD) by the differential speed between the two sets of nip rolls that contain the bubble. In the tenter frame process, the primary film is stretched in the longitudinal direction by accelerating the film forward, while simultaneously or sequentially accelerating the film in the transverse direction by guiding the heat softened sheet through a diverging geometry frame. This tenter process typically refers to a flat sheet of relatively thick film. Oriented films may exhibit high shrinkage when reheated to their orientation temperature. Oriented films may exhibit low or no shrinkage when reheated to their orientation temperature if the film has been annealed following the orientation process.

"Unoriented" herein refers to a film that has not been oriented and typically exhibit low heat shrinkage values, i.e., between 0 and 10% in both machine and transverse directions as measured at 102° C. for 10 minutes.

"Seal" herein refers to a bonding of a first film surface to a second film surface created by heating (e.g., by means of a heated bar, hot air, infrared radiation, ultrasonic sealing, etc.) the respective surfaces to at least their respective seal initiation temperatures.

"Adhesive" herein refers to a layer or material placed on one or more layers to promote the adhesion of that layer to another surface.

"Polyolefin" herein refers to homopolymers, copolymers, including, e.g., bipolymers, terpolymers, etc., having a methylene linkage between monomer units which may be formed by any method known to those skilled in the art. Examples of polyolefins broadly includes polymers such as polyethylene, ethylene copolymers having a small amount of a copolymer such as vinyl acetate, ethylene-alpha olefin copolymers (LLDPE), polypropylene, polybutene, and other polymeric resins falling in the "olefin" family classification. polyethylene (PE), low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), ethylene/propylene copolymers, polypropylene (PP), propylene/ethylene copolymer, polyisoprene, polybutylene, polybutene, poly-3-methylbutene-1, poly-4-methylpentene-1, ionomers, polyethylenes comprising ethylene/α-olefin which are copolymers of ethylene with one or more α-olefins (alpha-olefins) such as butene-1, hexene-1, octene-1, or the like as a comonomer, and the like.

The phrase "ethylene/α-olefin" (E/AO) refers to a copolymer produced by the co-polymerization of ethylene and any one or more α-olefin. The α-olefin in the present invention may have between 3-20 pendant carbon atoms. The co-polymerization of ethylene and an α-olefin may be produced by heterogeneous catalysis, i.e., co-polymerization reactions with Ziegler-Natta catalysis systems, for example, metal halides activated by an organometallic catalyst, i.e., titanium chloride, optionally containing magnesium chloride, complexed to trialkyl aluminum and may be found in patents such as U.S. Pat. No. 4,302,565 to Goeke et al. and U.S. Pat. No. 4,302,566 to Karol, et al., both of which are hereby incorporated, by reference thereto, in their entireties. Heterogeneous catalyzed copolymers of ethylene and α-olefin may include linear low-density polyethylene, very low-density polyethylene and ultra low-density polyethylene. These copolymers of this type are available from, for example, The Dow Chemical Company, of Midland, Mich., U.S.A. and sold under the trademark DOWLEX® resins. Additionally, the co-polymerization of ethylene and α-olefin may also be produced by homogeneous catalysis, for example, co-polymerization reactions with metallocene catalysis systems which include constrained geometry catalysts, i.e., monocyclopentadienyl transition-metal complexes taught in U.S. Pat. No. 5,026,798 to Canich, the teachings of which are incorporated herein by reference. Homogeneous catalyzed ethylene/α-olefin copolymers (E/AO) may include modified or unmodified ethylene/α-olefin copolymers having a long-chain branched (8-20 pendant carbons atoms) α-olefin comonomer available from The Dow Chemical Company, known as AFFINITY® and ATTANE® resins, TAFMER® linear copolymers obtainable from the Mitsui Petrochemical Corporation of Tokyo, Japan, and modified or unmodified ethylene/α-olefin copolymers having a short-chain branched (3-6 pendant carbons atoms) α-olefin comonomer known as EXACT® resins obtainable from ExxonMobil Chemical Company of Houston, Tex., U.S.A.

"Ionomer" as used herein refers to metal-salt, e.g., sodium or zinc, neutralized ethylene acrylic or methacrylic acid copolymers. Commercially available ionomers are sold under the trademark SURLYN® from E.I. de Pont de Nemours and Company, Wilmington, Del., U.S.A.

The term "modified" as used herein refers to a chemical derivative, e.g., one having any form of anhydride functionality, such as anhydride of maleic acid, crotonic acid, citraconic acid, itaconic acid, fumaric acid, etc., whether grafted onto a polymer, co-polymerized with a polymer, or blended with one or more polymers, and is also inclusive of derivatives of such functionalities, such as acids, esters, and metal salts derived therefrom.

"Comminuted" herein refers to a food or nonfood substance that is reduced in size by methods including chopping, flaking, grinding or mincing. A comminuted food substance includes fish or meat products that are reduced in size and restructured or reformulated such as gefilte fish, gyros, ground beef and sausage; and a mixture of two or more types of meat that have been reduced in size and combined, such as sausages made from two or more meats.

BRIEF DESCRIPTION OF THE DRAWINGS

A detailed description of embodiments of the invention follows, with reference to the attached drawings, wherein.

DETAILED DESCRIPTION OF THE INVENTION

Figure 1:
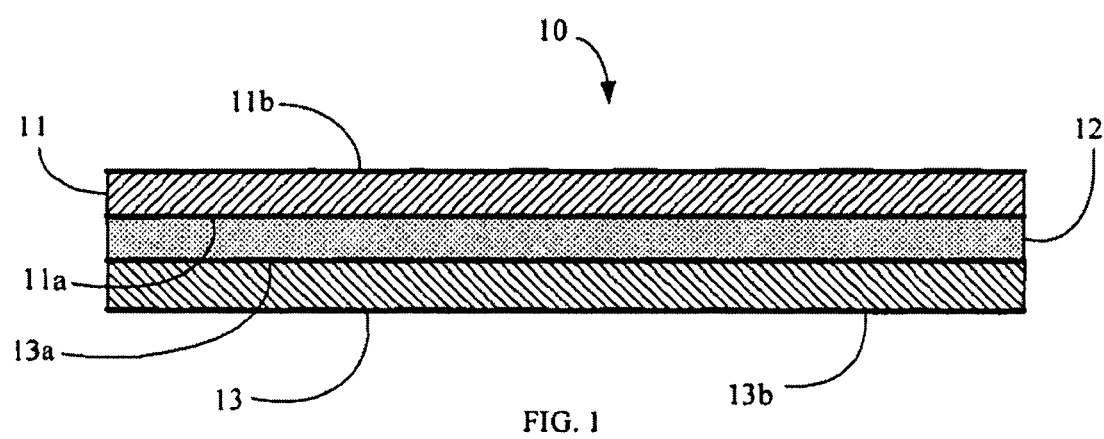
FIG. 1 illustrates a fragmentary cross-sectional view of one preferred embodiment of a peelable packaging film structure according to the present invention depicting a monolayer film for the first and second substrates.

A preferred embodiment of the peelable packaging film structure of the present invention is depicted in FIG. 1. Packaging film 10 includes a monolayer first thermoplastic substrate 11 having a first surface 11a and opposing, second surface 11b and a monolayer second thermoplastic substrate 13 having a first surface 13a and second surface 13b. As depicted, second surface 11b forms a first outer film-layer of film 10 and second surface 13b forms a second outer film-layer of film 10. First surface 11a and first surface 13a each comprises a polyolefin and is surface-treated such that each exhibits a surface energy of at least 36 dynes/cm. At least one of the first surface layers, 11 and 13, is oriented, preferably biaxially oriented, and at least one first surface is non-heat shrinkable such that film 10 has a Heat Shrinkage value of between 0 and 10% at 102° C. in either the machine or transverse directions. As illustrated, disposed between and in contact with first surface 11a and first surface 13a is internal contiguous film-layer 12 comprising an adhesive.

It is also contemplated that both first substrate 11 and second substrate 13 may both comprise a multilayer film having as many layers as desired.

Figure 2:
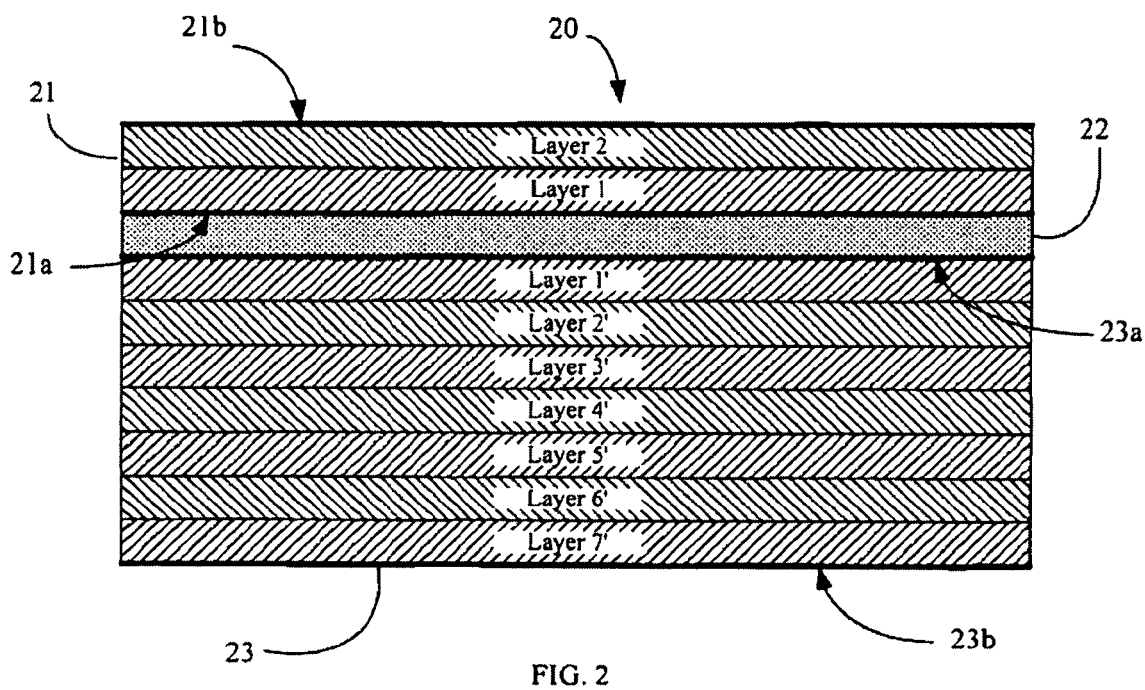
FIG. 2 illustrates a fragmentary cross-sectional view of another preferred embodiment of a peelable packaging film structure according to the present invention depicting a multilayer film for the first and second substrates.

In FIG. 2 there is illustrated another preferred embodiment of a peelable packaging film structure according to the present invention. Packaging film 20 comprising a first thermoplastic substrate 21 having a first surface 21a and a second surface 21b, an adhesive layer 22 and a second thermoplastic substrate 23 having a first surface 23a and a second surface 23b. As depicted, the first and second substrate are each a multilayered film comprising two layers (1 and 2), and seven layers (in sequential order of 1' through 7'), respectively. It will be noted layer 1 of substrate 21 and layer 1' of second substrate 23 are each first surface layers. First surface layers 1 and 1' each comprise a polyolefin and have been surface-treated such that each exhibits a surface energy of at least 36 dynes/cm. At least one of the first surface layers, 1 or 1', is oriented, preferably biaxially oriented, and at least one is non-heat shrinkable such that film 20 exhibits a Heat Shrinkage value of between 0 and 10% at 102° C. in either the machine or transverse directions. Both the first surface layers, 1 and 1', may be oriented and at least one non-heat shrinkable (i.e., annealed). It is also contemplated that at least one entire substrate 21 and 23 may be oriented, preferably biaxially oriented, and at least one entire substrate is non-heat shrinkable such that film 20 exhibits a Heat Shrinkage value of between 0 and 10% at 102° C. in either the machine or transverse directions. Alternatively, both entire substrates 21 and 23 may be oriented and non-heat shrinkable (i.e., annealed) or both entire substrates may be oriented and at least one entire substrate is non-heat shrinkable such that film 20 exhibits a Heat Shrinkage value of between 0 and 10% at 102° C. in either the machine or transverse directions.

Figure 3:
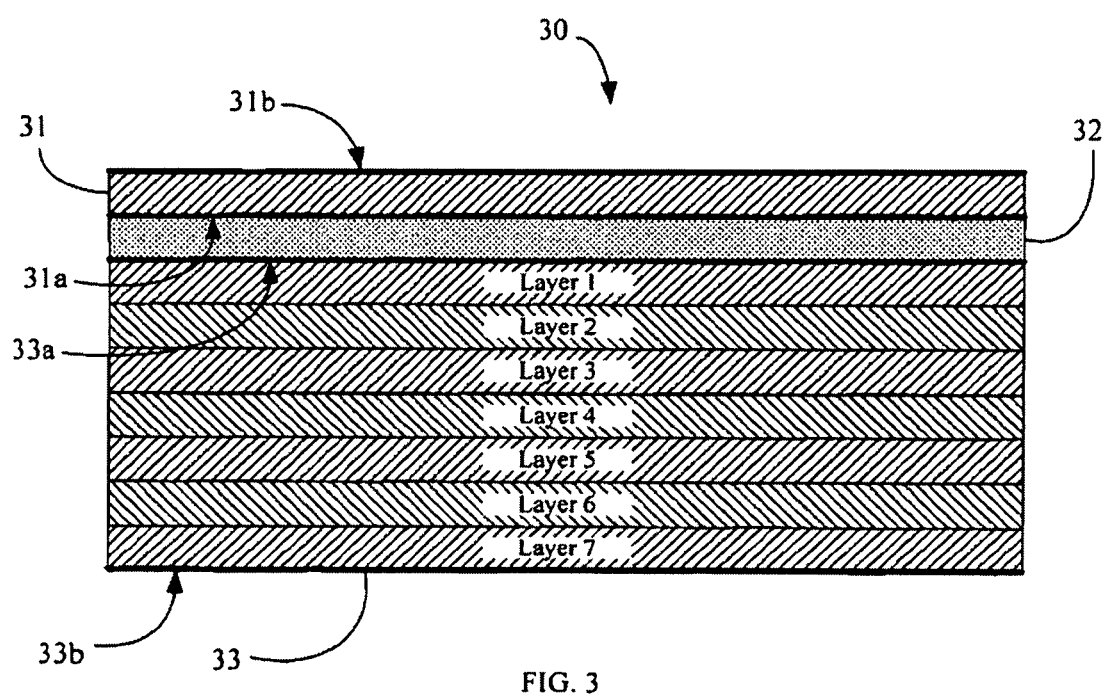
FIG. 3 illustrates a fragmentary cross-sectional view of yet another preferred embodiment of a peelable packaging film structure according to the present invention depicting a monolayer film for the first substrate and a multilayer film for the second substrate.

Depicted in FIG. 3 is yet another preferred embodiment of a peelable packaging film structure according to the present invention. Packaging film 30 comprises a monolayer first substrate 31, an adhesive layer 32, and a multilayer second substrate 33. As depicted, second substrate 33 has seven layers in sequential order from 1 through 7. As illustrated, the first and second substrates each include a first surface 31a and 33a (i.e., layer 1), respectively, and opposing second surface 31b and 33b (i.e., layer 7), respectively. Disposed between and in contact with first surfaces 31a and 33a is a contiguous layer of adhesive 32. As illustrated, the second surfaces 31b and 33b are each an outer film-layer of film 30. Each of the first surfaces comprises a polyolefin and has a surface energy of at least 36 dynes/cm. In this embodiment, at least one of the first surface layers, i.e., substrate 31 or first surface layer 1 of second substrate 33, is oriented, preferably biaxially oriented, and at least one of the first surface layers, i.e., substrate 31 or first surface layer 1 of second substrate 33, is non-heat shrinkable such that packaging film 30 exhibits a Heat Shrinkage value of between 0 and 10% at 102° C. in either the machine or transverse directions. Both the first surface layers, i.e., substrate 31 and first surface layer 1 of second substrate 33, may be oriented and at least one of the first surface layer, i.e., substrate 31 or layer 1 of second substrate 33, is non-heat shrinkable such that packaging film 30 exhibits a Heat Shrinkage value of between 0 and 10% at 102° C. in either the machine or transverse directions. Alternatively, least one of the first surface layers, i.e., substrate 31 or first surface layer 1 of second substrate 33, is oriented, preferably biaxially oriented, and at least one first surface layer, i.e., first substrate 31 or first surface layer 1 of second substrate 33, is non-heat shrinkable (i.e., annealed) such that packaging film 30 exhibits a Heat Shrinkage value of between 0 and 10% at 102° C. in either the machine or transverse directions. Further still, both first surface layers, i.e., substrate 31 and first surface layer 1 of second substrate 33, may be oriented, preferably biaxially oriented, and at least one first surface layer, i.e., first substrate 31 or first surface layer 1 of second substrate 33, is non-heat shrinkable (i.e., annealed) such that packaging film 30 exhibits a Heat Shrinkage value of between 0 and 10% at 102° C. in either the machine or transverse directions.

Examples of monolayer oriented films which may be used as first thermoplastic substrate 11 (and 31) in the present invention are presented below in Table 1. Examples of suitable multilayer oriented films for use in the present invention are known in the art and have been described in U.S. Pat. Nos. 4,532,189; 4,551,380; 4,755,419; 4,839,235; 4,865,920; 5,004,647; and 5,298,302, which are incorporated by reference herein in their entireties.

TABLE 1

Monolayer Heat Shrinkable Substrates*

| Example | Composition (% wt.)** | | | | | | | % Shrinkage† (MD/TD) |
|---|---|---|---|---|---|---|---|---|
| #1 | 100% | PP | | | | | | 10/10 |
| #2 | 25% | LDPE | 75% | LLDPE | | | | 25-35/25-35 |
| #3 | 65% | VLDPE | 25% | LLDPE | 10% | EMAA | | 25-35/25-35 |
| #4 | 25% | LDPE | 10% | LMDPE | 65% | LLDPE | | 25/25 |
| #5 | 48% | VLDPE | 6% | Ionomer | 45% | Plastomer | | 65/65 |
| #6 | 74% | VLDPE | 16% | EVA-1 | 10% | LLDPE | | 35-45/35-45 |
| #7 | 82% | ULDPE | 8% | EVA-1 | 10% | HDPE | | 20-30/20-30 |
| #8 | 18% | LDPE | 55% | VLDPE | 8% | EVA-1 | 19% LLDPE | 30-40/30-40 |
| #9 | 18% | LDPE | 8% | EVA-1 | 19% | LLDPE | 55% VLDPE | 30-40/30-40 |
| #10 | 12% | LDPE | 55% | VLDPE | 8% | EVA-1 | 25% mPE | 30-40/30-40 |
| #11 | 18% | LDPE | 53% | VLDPE | 19% | LLDPE | 10% Plastomer | 30-40/30-40 |

*All substrates were corona-treated to a surface energy of between 36 and 41 dynes/cm.
**All compositions include between 500 and 3000 ppm slip additive and between 1000 and 3000 ppm antiblock additives. Examples #2 and 3 further include between 300 and 600 ppm processing aids.
†All substrate values were biaxially oriented and heat shrinkage values were determined at 102° C. for 10 minutes.
"PP" is a polypropylene resin having a melt index of 5 g/10 min., density of 0.9 g/cm$^3$ and a melting point of 142° C.. An example of a suitable commercially available polypropylene resin includes Dow ™ 6D65L from the Dow Chemical Company, Midland, Michigan, U.S.A.
"LDPE" is a low density polyethylene resin having a melt index of 2 g/10 min. and density of 0.923 g/cm$^3$. Examples of suitable commercially available low density polyethylene resin include Dow ™ 503A LDPE from the Dow Chemical Company, Midland, Michigan, U.S.A., and ExxonMobil ™ LDPE LD100 from ExxonMobil Chemical Company, Houston, Texas, U.S.A.

TABLE 1-continued

Monolayer Heat Shrinkable Substrates*

| Example | Composition (% wt.)** | % Shrinkage† (MD/TD) |
|---|---|---|

"LLDPE" is a linear low density polyethylene resin having a melt index of 0.9-1.0 g/10 min., density of 0.92 g/cm$^3$. Examples of suitable commercially available linear low density polyethylene resins include Dow ™ 2645G, 2045G and Dow ™ Elite ® 5100G from the Dow Chemical Company, Midland, Michigan, U.S.A, and Sclair ® FP120 A from the Nova Chemicals, Inc. Calgary, Alberta, Canada.

"VLDPE" is a very low density polyethylene resin having a melt index of 0.5-1.0 g/10 min., density of 0.910-0.912 g/cm$^3$. An example of a suitable commercially available very low density polyethylene resin includes Dow ™ 4201G from the Dow Chemical Company, Midland, Michigan, U.S.A.

"EMAA" is an ethylene-methacrylic acid copolymer resin having a melt index of 2.5 g/ 10 min. and a melting point of 84° C.. An example of a suitable commercially available ethylene-methacrylic acid copolymer resin includes DuPont ™ Nucrel ® 903HC from E. I. du Pont de Nemours and Company, Wellington, Delaware, U.S.A.

"LMDPE" is a linear medium density polyethylene resin having a melt index of 1 g/10 min. and density of 0.93 g/cm$^3$. An example of a suitable commercially available linear medium density polyethylene resin includes Dow ™ 2038.68G from the Dow Chemical Company, Midland, Michigan, U.S.A.

"Ionomer" is a zinc salt of an ethylene/methacrylic acid copolymer resin having a melt index of 5.5 g/10 min. and density of 0.952 g/cm$^3$. An example of a suitable commercially available ionomner resin includes DuPont ™ Surlyn ® 1705-1 from E. I. du Pont de Nemours and Company, Wellington, Delaware, U.S.A.

"Plastomer" is an ethylene/alpha olefin copolymer resin having a melt index of 1 g/10 min. and density of 0.895 g/cm$^3$. An example of a suitable commercially available plastomer includes ExxonMobil Exact ® 9523 from ExxonMobil Chemical Company, Houston, Texas, U.S.A.

"EVA-1" is an ethylene/vinyl acetate copolymer resin having a vinyl acetate content of 12% (wt.), a melt index of 0.35 g/10 min., and density of 0.93 g/cm$^3$. An example of a suitable commercially available ethylene/vinyl acetate copolymer resin having a vinyl acetate content of 12% (wt.) includes DuPont ™ Elvax ® 3135XZ from E. I. du Pont de Nemours and Company, Wellington, Delaware, U.S.A.

"HDPE" is a high density polyethylene resin having a melt index of 0.4 g/10 min. and density of 0.949 g/cm$^3$. An example of a suitable commercially available plastomer includes Equistar ™ Alathon ® L5040 from Lyondell Chemical Company, Houston, Texas, U.S.A.

"mPE" is a metallocene-catalysis ethylene/hexene copolymer resin having a melt index of 1 g/10 min. and density of 0.92 g/cm$^3$. An example of a suitable commercially available mPE includes Enable ® 20-10 CB from ExxonMobil Chemical Company, Houston, Texas, U.S.A.

Each of the oriented substrates are biaxially stretched by the well-known trapped bubble or double bubble technique as for example described in U.S. Pat. Nos. 3,456,044 and 6,511,688 whose descriptions and teachings are hereby incorporated by reference in their entireties. In this technique an extruded primary tube leaving the tubular extrusion die is cooled, collapsed and then preferably oriented by reheating, re-inflating to form a secondary bubble and re-cooling. The oriented film is preferably biaxially oriented or stretched wherein transverse direction (TD) orientation is accomplished by inflation to radially expand the heated film. The stretch ratios in the biaxial orientation to form the first substrate are preferably sufficient to provide a film with total thickness of between about 0.5 and 5 mil and preferably about 0.75 mil.

Adhesive layers 12, 22 and 32 may comprise any suitable composition that provides a desired level of peelable adhesion with the one or more surfaces in contact with the adhesive layer material. Adhesives have been generally described in Kirk-Othmer-Adhesives; pg. 445-466; Vol. 1; 1991, by Aldophus Pocius, the disclosure of which is incorporated herein. Preferably, the adhesive is any packaging adhesive which may include fluid adhesives, solvent-based adhesives, and solvent-free adhesives. As used herein, the phrase "fluid adhesive" refers to any substance, inorganic or organic, natural or synthetic, that tends to flow under pressure and/or heat at a rate sufficient of coat a layer in a commercial process. Suitable fluid adhesives may have a wide range of viscosities at room temperature and may have a variety of forms, which include, but are not limited to, for example, solutions, dispersions, emulsions, pastes, mastics, and the like. Suitable organic adhesives may include natural adhesives, i.e., for example, hide and bone glue, fish glue, rubber latex, terpene resins, and mucilages, and synthetic adhesives, which include, but are not limited to polyvinyl acetate emulsions, ethylene/vinyl acetate copolymers, polyurethanes, silicone polymers, cyanoacrylates, epoxy, isocyanates and the like. Fluid adhesives may further include hot-melt adhesives, for example, pressure-sensitive adhesives. Pressure-sensitive adhesives may include, but are not limited to, tackified rubber adhesives, such as natural rubber, olefins, silicones, polyisoprene, polybutadiene, polyurethanes, styrene-isoprene-styrene and styrene-butadiene-styrene block copolymers, and other elastomers; and tackified or untackified acrylic adhesives such as copolymers of isooctylacrylate and acrylic acid, which can be polymerized by radiation, solution, suspension, or emulsion techniques. As used herein, the phrase "solvent-based adhesive" refers to an adhesive system which comprises an adhesive and at least one solvent and requires that the solvent be removed by evaporation (drying) after the solvent-based adhesive is applied to at least one film substrate, layer and the like. A solvent-based adhesive may include a solvent such as conventional petrochemical-based solvents, i.e., for example, but not limited to, alcohols, toluene, esters, and the like, a water-based solvent, and combinations thereof. As used herein, the phrase "solvent-free adhesive" refers to an adhesive system which comprises an adhesive and may include a solvent, but does not require that the solvent be removed by evaporation after the solvent-free adhesive is applied to a film substrate, layer and the like. A solvent-free adhesive may also comprise a solvent-free adhesive which is diluted with a conventional petrochemical-based or water-based solvent prior to coating in order to facilitate its application. Solvent-free adhesives may further comprise radiation-curable adhesives which polymerize and/or cross-link when exposed to ultraviolet light or ionizing radiation sources. Preferably adhesive layers 12, 22 and 32 are a solvent-based adhesive, more preferably, a solvent based polyurethane adhesive, and most preferably, a solvent based polyether polyurethane adhesive. Examples of a suitable adhesive for use in the present invention include Avadyne® AV5210/CA500-83 and Lamal™ HSA/Lamal™ C. The Avadyne® AV5210/CA500-83 system is identified as two-component ethanol-based adhesive having an amine-terminated polyurethane pre-polymer and a epoxy-terminated ether co-reactant, and may be purchased from Henkel KGaA, Düsseldorf, Germany. The Lamal™ HSA/Lamal™ C is also a two-component ethanol-based adhesive system having a polyether urethane ingredient admixed with a co-reactant, Lamal C. Lamal™ HSA with the co-reactant are supplied by the Rohm and Haas Company, Philadelphia, Pa., U.S.A.

As depicted in FIGS. 2 and 3, second substrates 23 and 33 each comprise a seven-layer film. Examples of seven-layer multilayer non-heat shrinkable films which may be used in the present invention are presented below in Table 2.

TABLE 2

Compositions of Multilayer Non-Heat Shrinkable Substrates (wt.)

| Layer | Example #1 | Example #2 | Example #3 | Example #4 |
|---|---|---|---|---|
| 1* | 41.0% LLDPE<br>30.0% mLLDPE<br>26.5% $TiO_2$(70%) in LDPE<br>2.5% Slip Additive (5%) in PE | 56.0% LDPE<br>15.0% LLDPE<br>26.5% $TiO_2$(70%) in LDPE<br>2.5% Slip Additive (5%) in PE | 65.0% LLDPE<br>30.0% mLLDPE<br>2.5% Slip Additive (5%) in PE<br>2.5% Antiblock Additive (20%) in PE | 92.2% VLDPE<br>6.0% Antiblock Additive<br>1.2% Slip Additive (5%) in PE<br>0.6% LLDPE Processing Additive (3%) in PE |
| 2 | 66.0% VLDPE<br>18.0% $TiO_2$(70%) in LDPE<br>16.0% mod-PE | 66.0% LDPE<br>18.0% $TiO_2$(70%) in LDPE<br>16.0% mod-PE | 90.0% VLDPE<br>10.0% mod-PE | 90.0% VLDPE<br>10.0% mod-PE |
| 3 | 100% Polyamide | 100% Polyamide | 100% Polyamide | 100% Polyamide |
| 4 | 100% EVOH | 100% EVOH | 100% EVOH | 100% EVOH |
| 5 | 100% Polyamide | 100% Polyamide | 100% Polyamide | 100% Polyamide |
| 6 | 66.0% ULDPE<br>18.0% $TiO_2$(70%) in LDPE<br>16.0% mod-PE | 66.0% LDPE<br>18.0% $TiO_2$(70%) in LDPE<br>16.0% mod-PE | 90.0% VLDPE<br>10.0% mod-PE | 80.0% EVA-3<br>20.0% mod-PE |
| 7 | 55.5% LLDPE<br>35.0% EVA-1<br>5.0% $TiO_2$(70%) in LDPE<br>4.5% Slip Additive (5%) in PE | 55.5% LLDPE<br>35.0% EVA-1<br>5.0% $TiO_2$(70%) in LDPE<br>4.5% Slip Additive (5%) in PE | 84.0% EVA-2<br>9.2% LLDPE<br>3.7% Slip Additive (5%) in PE<br>3.1% Antiblock Additive (20%) in PE | 78.1% EVA-3<br>15.5% Antiblock (20%) in EVA-3<br>6.4% Slip (5%) in EVA-3 |
| Total Film Thickness | 1.26 mil | 1.26 mil | 1.25 mil | 1.75 mil |

Layer 1 was corona-treated to a surface energy of between 38 and 50 dynes/cm.

"mod-PE" is an anhydride-modified polyethylene copolymer resin having a melt index of 2.7-4.0 g/10 min. and density of 0.910-0.939 g/cm$^3$. An example of a suitable commercially available anhydride-modified polyethylene copolymer resin includes Equistar ™ PX 3308 from Equistar Chemicals, LLP, Houston, Texas, U.S.A.

"Polyamide" is a nylon 6/nylon 66 copolymer resin having a density of 1.12 g/cm$^3$ and a melting point (DSC) of 196.1° C.. An example of a suitable commercially available nylon 6/nylon 66 copolymer resin includes Ultramid ® C33-01 from BASF Polyamides and Intermediates, Freeport, Texas, U.S.A.

"EVOH" is an ethylene/vinyl alcohol copolymer resin having an ethylene content of 38% (mol.), a melt index of 3.2 g/10 min. and density of 1.17 g/cm$^3$. An example of a suitable commercially available ethylene/vinyl alcohol copolymer resin having an ethylene content of 38% (mol.) includes Soarnol ® ET 3803 from Soarus, LLP, Arlington Heights, Illinois, U.S.A.

"mLLDPE" is a metallocene-catalysis ethylene/hexene copolymer resin having a melt index of 1 g/10 min and density of 0.918 g/cm$^3$. Examples of a suitable commercially available mLLDPE include Exceed ® 1018C and 1018CA both from ExxonMobil Chemical Company, Houston, Texas, U.S.A.

"EVA-2" is an ethylene/vinyl acetate copolymer resin having a vinyl acetate content of 5% (wt.), a melt index of 2.0 g/10 min. and density of 0.924 g/cm$^3$. An example of a suitable commercially available ethylene/vinyl acetate copolymer resin having a vinyl acetate content of 5% (wt.) includes ExxonMobil LD306 from ExxonMobil Chemical Company, Houston, Texas, U.S.A.

"EVA-3" is an ethylene/vinyl acetate copolymer resin having a vinyl acetate content of 18% (wt.), a melt index of 30.0 g/10 min. and density of 0.94 g/cm$^3$. An example of a suitable commercially available ethylene/vinyl acetate copolymer resin having a vinyl acetate content of 18% (wt.) includes DuPont ™ Elvax ® 3176CW-3 from E. I. du Pont de Nemours and Company, Wellington, Delaware, U.S.A.

Second substrates 13, 23 and 33 may be produced using simple blown film processes which are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Generally, the simple blown film process may include an apparatus having a multi-manifold circular die head through which the film layers are forced and formed into a cylindrical multilayer film bubble. The bubble may be quenched, e.g., via cooled water bath, solid surface and/or air, and then ultimately collapsed and formed into a multilayer film. It is appreciated by a person of ordinary skill in the art that cast extrusion techniques may also be used to fabricate the non-heat shrinkable thermoplastic substrates for use in the present invention.

Unless otherwise noted, the polymer resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the polymer layers, by blending prior to extrusion. The resins and any additives may be introduced to an extruder where the resins are melt-plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

Preferably, a surface-treatment is applied to the polyolefin-containing surfaces (11a and 13a; 21a and 23a; and 31a and 33a) prior to lamination with adhesive layer. "Surface-treatment" herein refers to any technique which alters the surface energy (or surface tension) of a film layer and may include techniques such as, but is not limited to, corona, flame, and plasma treatment, ozone, ultra-high frequency electrical discharge, UV or laser bombardment, chemical priming, and the like. The phrase "corona treatment" refers to, in general, the process wherein an electrical discharge generated by a high-voltage electric field passes through a polymer substrate. It is believed that the electrical discharge or "corona" may ionize the oxygen molecules surrounding the substrate which chemically interact with the surface atoms of the substrate thereby changing the surface energy of the polymer substrate. Preferably, the first surface of the first and second substrates are corona treated such that each surface has a surface energy of at least 30 dynes/cm, preferably, at least 34 dynes/cm, and more preferably, between 36-50 dynes/cm. As used herein, the phrases "surface tension" and "surface energy" are used interchangeably herein and refer to the affinity between molecules at the surface of a polymer film layer for one another. It is appreciated by a person of ordinary skill in the art that surface tension is a measure of surface energy of a polymer film substrate which involves determination of the interaction between the solid film substrate and a test liquid or "dyne liquid." Surface tension is expressed in units of force per unit of width, e.g., dynes per centimeter. Measuring surface energy of a polymer film substrate may also be known as a "dyne test." Typically, a dyne test involves applying a dyne liquid, e.g., a predetermined mixture of ethylene glycol monoethyl ether and formamide having a known surface tension, across a one square inch of a polymer surface. If the continuous film of liquid remains intact or fails to wet-out for two or more seconds, the next higher surface tension liquid is applied. If the liquid dissipates in less than two seconds, the next lower surface tension solutions are tried until an exact measurement is attained.

To produce the final packaging film structures 10, 20 and 30 of the present invention, extrusion lamination, co-extrusion lamination, adhesion lamination, or the like may be used. Particularly, adhesive lamination is preferred in that there is a remarkable improvement in the seal strength of the peelable interface compared with other conventional methods. With adhesive lamination, the solid-state first and second films are bonded together by an adhesive which is applied to one or both film. Depending on the type of adhesive used, a further step of drying or curing of the adhesive may be required after its application. With an adhesive positioned between and in contact with both the first and second films, the films are pressed together between the two heated steel rollers to form the assembled packaging web. The steps of contacting and pressing the films together may be accomplished sequentially or simultaneously. The temperature of the steel rollers or nip can vary depending upon the adhesive material used and the speed at which the films travel through the rollers. Particularly with a solvent-based adhesive, more particularly with a solvent-based polyurethane adhesive, and most particularly with a solvent-based polyether polyurethane adhesive, it is preferred that the nip temperature is controlled between a temperature of between about 100° and 160° F., more preferably, between 105° and 145° F., and most preferably, at about 140° F. The final packaging film is then wound around a roller for storage and/or further processing. It is further contemplated that higher nip temperatures may be needed than those described above when polyolefins such as, for example, polypropylene is used as one or both first surface layers in the present invention.

Figure 4:
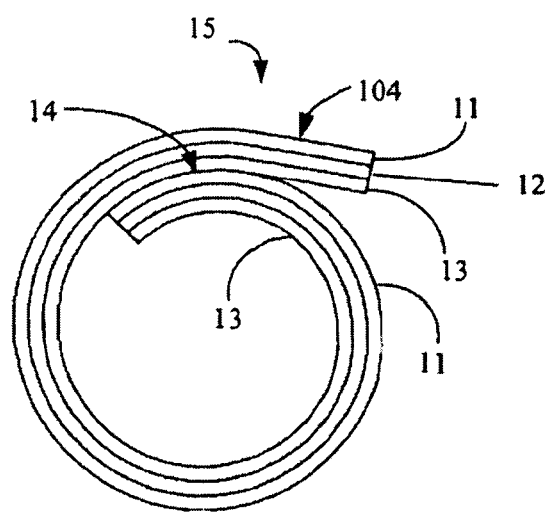
FIG. 4 illustrates a fragmentary cross-sectional view depicting a film illustrated in FIG. 1 in an over lapping sealed state.
Figure 5:
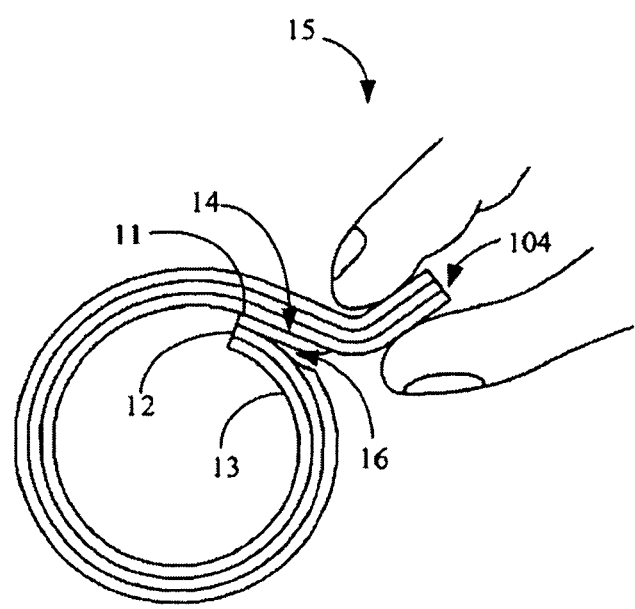
FIG. 5 illustrates a fragmentary cross-sectional view depicting a film illustrated in FIG. 1 in an over lapping sealed state being opened by the overlaid non-heat sealed portion with fingers.

Referring now to FIGS. 4 and 5, film 10 is illustrated as being joined to itself to provide tubular film 15. As depicted, film 10 may be heat sealed in an over-lapping manner which provides a non-peelable interface 14 between first substrate 11 and second substrate 13 (in FIG. 4) and a peelable interface 16 formed between the first substrate 11 and adhesive layer 12 (in FIG. 5). FIGS. 4 and 5 further illustrate an overlaid non-heat sealed portion or seal flap 104 which may be grasped and used to peel apart the film. The peeling mechanism of the present invention can be clearly understood from the cross-sectional view shown in FIG. 5. Immediately following an initial disruption of the seal (measured as the initial seal strength), the internal packaging film-layer, i.e., adhesive layer 12, is delaminated in a controlled manner (measured as the peelable seal strength) away from the outer packaging film-layer, i.e., first substrate 11. Although not shown, other embodiments of the present invention may include the peelable interface between the second substrate 13 and adhesive layer 12. It will be understood by those skilled in the art that a layer interface having seal strengths of less than 60 grams-force/inch will not provide sufficient bonding force to maintain adhesion between two film surfaces and seal strengths of 2,500 grams-force/inch and higher can not be manually delaminated without tearing or damaging the film substrate. It is also contemplated that film structures 20 and 30 may be heated sealed to itself in an over-lapping manner as described above for film 10.

Example 1

In accordance with the present invention, a monolayer oriented first thermoplastic substrate 31 having a composition of Example #8 (Table 1) was joined to a multilayer non-oriented, non-heat shrinkable second thermoplastic substrate 33 having a composition of Example #1 (Table 2) via adhesive lamination with adhesive layer 32. The structure of this film is shown in FIG. 3. This film had a total thickness of about 2.0 mil, a oxygen transmission rate of 0.5 cm$^3$/100 in$^2$/24 hr @23° C. and 80% relative humidity and a moisture vapor transmission rate of less than 1.0 g/H$_2$O/100 in$^2$/24 hr @38° C. and 90% relative humidity. An overlapping heat-seal was formed by heat sealing surface 31b to surface 33b (i.e., layer 7) (see FIG. 3). The initial seal strength was about 1,320 grams-force/inch and the peelable seal strength was about 200 grams-force/in. This film exhibited a Heat Shrinkage value of between 0 and 10% at 102° C. in either the machine or transverse directions.

Example 2

A monolayer heat shrinkable first thermoplastic substrate 31 having a composition of Example #8 (Table 1) was laminated to a multilayer non-heat shrinkable second thermoplastic substrate 33 having a composition of Example #2 (Table 2) via adhesive lamination with an adhesive layer 32. The structure of this film is shown in FIG. 3. This film had a total thickness of about 2.0 mil, a oxygen transmission rate of 0.5 cm$^3$/100 in$^2$/24 hr @23° C. and 80% relative humidity and a moisture vapor transmission rate of less than 1.0 g/H$_2$O/100 in$^2$/24 hr @38° C. and 90% relative humidity. An overlapping heat-seal was formed by heat sealing surface 31b to surface 33b (i.e., layer 7) (see FIG. 3). The initial seal strength was between about 1,000 and 1,500 grams-force/inch and the peelable seal strength was between about 100 and 200 grams-force/in. This film exhibited a Heat Shrinkage value of between 0 and 10% at 102° C. in either the machine or transverse directions.

Comparative Example

A 1.0 mil multilayer of non-oriented first thermoplastic substrate, 21, was adhesive laminated via adhesive layer 22, to a multilayer, non-oriented second thermoplastic substrate 23 having a composition of Example #3 (Table 2) to form a packaging film having a structure identical to that depicted in FIG. 2. The structure of this film is shown in FIG. 2. The composition of the first substrate 21 was the following: Layer 1: 76.0% (wt.) LLDPE+26.5% TiO2 (70%) in LDPE; Layer 2: 63.0% (wt.) LLDPE+25.0% (wt.) ethylene/hexene copolymer resin having a melt index of 7.5 g/10 min and a density of 0.99 g/cm$^3$+12.0% (wt.) slip and antiblock additives. This film had a total thickness of about 2.0 mil, a oxygen transmission rate of 0.5 cm$^3$/100 in$^2$/24 hr @23° C. and 80% relative humidity and a moisture vapor transmission rate of less than 1.0 g/H$_2$O/100 in$^2$/24 hr @38° C. and 90% relative humidity. An overlapping heat-seal was formed by heat sealing surface 21$b$ (i.e., layer 2) to surface 23$b$ (i.e., layer 7'). The initial seal strength of the overlapping heat seal was 2000-3000 grams-force/in. No peelable seal strength was observed. This film exhibited a Heat Shrinkage value of between 0 and 10% at 102° C. in either the machine or transverse directions.

As Table 3 indicates, the values for Slow Rate Penetration Resistance (against both the inner film-surface (21$b$ and 31$b$) and outer film-surface (23$b$ and 31$b$) (see FIGS. 2 and 3), Tensile Peak Stress, Tensile Yield and Tensile Modulus were higher and thus improved for the Example 1 of the present invention in comparison with the Comparative Example. Lower values were obtained for Tear Resistance and Tensile Elongation for Example 1 compared with the Comparative Example. Lower Tear Resistance and Tensile Elongation values are both desirable characteristics in a packaging film because lower tear resistance improves the ease of tearing or opening of a package, and lower tensile elongation increases the dimensional stability of the film which improves the printing quality when the film is printed.

TABLE 3

Average Film Properties

|  | Example 1 | Comparative Example |
|---|---|---|
| Slow Rate Penetration Resistance (Outer Surface) in Newtons | 16.90 | 10.57 |
| Slow Rate Penetration Resistance (Inner Surface) in Newtons | 22.02 | 13.19 |
| Tensile Yield (MD) in psi | 2764 | 2166 |
| Tensile Yield (TD) in psi | 2797 | 2159 |
| Tensile Peak Stress (MD) in psi | 7114 | 5169 |
| Tensile Peak Stress (TD) in psi | 6715 | 4151 |
| Tensile Modulus (MD) in psi | 66259 | 58319 |
| Tensile Modulus (TD) in psi | 64742 | 61829 |
| Tear Resistance (MD) in gram-force | 214.40 | 1058.29 |
| Tear Resistance (TD) in gram-force | 169.60 | 476.80 |
| Tensile Elongation (MD) in % | 157 | 389 |
| Tensile Elongation (MD) in % | 156 | 536 |

Figure 6:
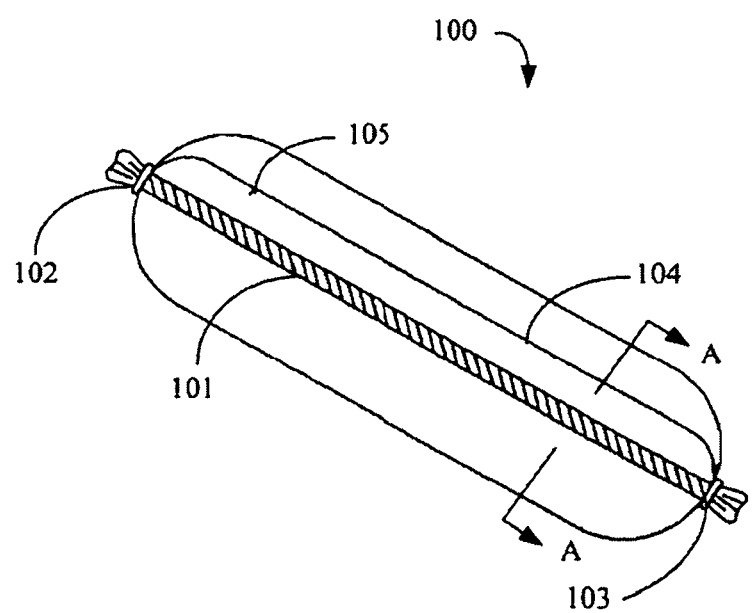
FIG. 6 illustrates a cylindrically shaped package comprises the peelable film according to the present invention.
Figure 7:
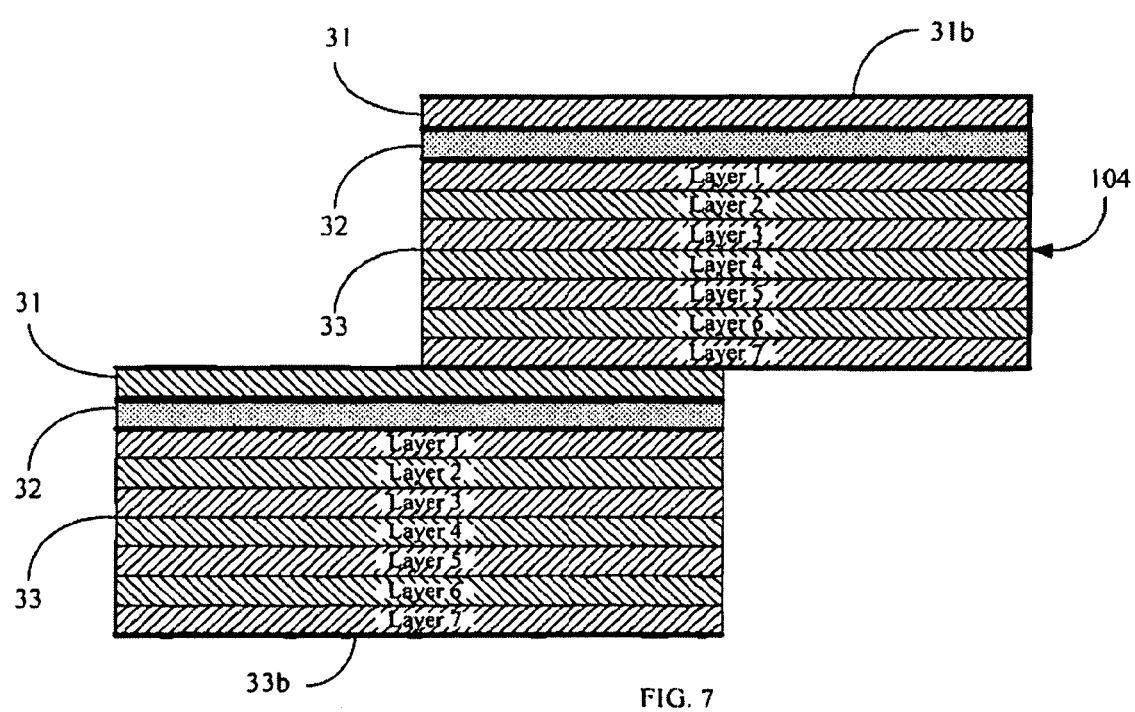
FIG. 7 illustrates a transverse cross-sectional view depicting a film illustrated in FIG. 3 in an overlaid non-heat sealed state illustrated in FIG. 6, taken through section A-A of FIG. 6.

As shown in FIG. 6, a cylindrically shaped package 100 may be provided using the peelable films of the present invention. Package 100 includes a longitudinal overlapping heat-seal section 101, a first crimpled closed end 102 and second crimped closed end 103. An opening means (device to facilitate opening) 105 may be provided in the heat-seal section along an edge thereof. The opening means may be a V-shaped notch, an 1-shaped notch, or a flaw. Included in the heat-seal section 101 is an overlaid non-heat sealed flap 104 which is provided for the consumer to grasp and use to delaminate seal section 101 and thereby peel open the package. FIG. 7 illustrates a fragmentary cross-sectional view of film 30 taken alone lines A-A of FIG. 6 depicting an enlarged overlaid non-heat sealed flap 104 of package 100.

Unless otherwise noted, the physical properties and performance characteristics reported herein were measured by test procedures similar to the following ASTM methods. The ASTM test procedures are hereby incorporated herein by reference in their entireties.

| Density | D-1505 |
|---|---|
| Heat Shrinkage | D-2732 |
| Melt Index | D-1238 |
| Melting Point | D-3417 |
| Oxygen Transmission Rate | D-3985 |
| Seal Strength | F-88-94 |
| Slow Rate Penetration Resistance | F-1306 |
| Surface Energy | D-2578 |
| Tensile Yield | D-882 |
| Tensile Modulus | D-882 |
| Tensile Elongation | D-882 |
| Tensile Peak Stress | D-882 |
| Tear Resistance (Elmendorf Tear) | D-1922 |

It will be apparent to those skilled in the art that modifications and additions can be made to the various embodiments described above, without departing from the true scope and spirit of the present invention. It should be understood that this invention is not intended to be unduly limited by the illustrative embodiments set forth herein and that such embodiments are presented by way of example only with the scope of the invention intended to be limited only by the claims set forth herein as follows.

What is claimed is:
1. A peelable packaging film comprising:
a) a first monolayer heat shrinkable thermoplastic substrate comprising a first surface and a second surface;
b) a second non-heat shrinkable thermoplastic substrate comprising a first surface on a first surface layer and a second surface, wherein both first surfaces of the first and second substrate each comprises a polyolefin and has a surface energy of at least 36 dynes/cm; wherein said second thermoplastic substrate has a Heat Shrinkage value of between 0 and 10% at 102° C. in either the machine or transverse directions;
c) an adhesive layer comprising a polyurethane and contiguously disposed between and in contact with each of the first surfaces of the substrates; and
d) a peelable interface provided between the adhesive layer and the first surface of the first monolayer heat shrinkable thermoplastic substrate.
2. The peelable packaging film according to claim 1, wherein the first surface of the first and second substrate each comprises polyethylene.
3. The peelable packaging film according to claim 1, wherein at least one first surface layer is biaxially oriented.
4. The peelable packaging film according to claim wherein both first surface layers are oriented.
5. The peelable packaging film according to claim 1, wherein the adhesive layer comprises solvent-based polyurethane.
6. The peelable packaging film according to claim 1, wherein the adhesive layer comprises solvent-based polyether polyurethane.
7. The peelable packaging film according to claim 1, wherein the packaging film has a Slow Rate Penetration Resistance value greater than 11 Newtons.
8. The peelable packaging film according to claim 7, wherein the packaging film has a Slow Rate Penetration Resistance value greater than 14 Newtons.
9. The peelable packaging film according to claim 1, wherein the packaging film has a Tear Resistance value of less than 400 grams-force at least one direction.

10. The peelable packaging film according to claim 9, wherein the packaging film has a Tear Resistance value of less than 200 grams-force at least one direction.

11. The peelable packaging film according to claim 1, wherein the peelable interface has a peelable seal strength value of between 60 and 2,500 grams-force/in.

12. The peelable packaging film according to claim 1, wherein a second outer packaging film-layer of the peelable packaging film comprises the second surface of the second substrate.

13. The peelable packaging film according to claim 1, wherein the packaging film forms an easy-open cylindrically shaped package by folding the film onto itself to form a tubular casing comprising an outer package surface comprising the first substrate, joining the overlaying edges together lengthwise to form a longitudinal peelable seal portion and joining the tubular casing crosswise to form a first end seal portion and an opposing second end seal portion.

14. The peelable packaging film according claim 13, wherein the package further comprises a comminuted product.

15. A peelable packaging film comprising:
   a) a first monolayer heat shrinkable thermoplastic substrate comprising a first surface and a second surface;
   b) a second non-heat shrinkable thermoplastic substrate comprising a first surface on a first surface layer and a second surface, wherein both first surfaces of the substrates each comprises a polyolefin and has a surface energy of at least 36 dynes/cm; wherein said second thermoplastic substrate has a Heat Shrinkage value of between 0 and 10% at 102° C. in either the machine or transverse directions;
   c) a solvent-based polyurethane adhesive layer contiguously disposed between the first surfaces of the substrates; and
   d) a peelable interface provided between the adhesive layer and the first surface of the first monolayer heat shrinkable thermoplastic substrate such that the peelable interface has a peelable seal strength value of between 60 and 2,500 grams-force/in.

16. The peelable packaging film according to claim 15, wherein the first surface of the first and second substrate each comprises polyethylene.

17. The peelable packaging film according to claim 15, wherein at least one first surface layer is biaxially oriented.

18. The peelable packaging film according to claim 15, wherein both first surface layers are oriented.

19. The peelable packaging film according to claim 15, wherein the adhesive layer comprises solvent-based polyether polyurethane.

20. The peelable packaging film according to claim 15, wherein the packaging film has a Slow Rate Penetration Resistance value greater than 11 Newtons.

21. The peelable packaging film according to claim 15, wherein the packaging film has a Tear Resistance value of less than 200 grams-force at least one direction.

22. The peelable packaging film according to claim 15, wherein a second outer packaging film-layer of the peelable packaging film comprises the second surface of the second substrate.

23. The peelable packaging film according to claim 15, wherein the packaging film forms an easy-open cylindrically shaped package by folding the film onto itself to form a tubular casing comprising an outer package surface comprising the first substrate, joining the overlaying edges together lengthwise to form a longitudinal peelable seal portion and joining the tubular casing crosswise to form a first end seal portion and an opposing second end seal portion.

24. The peelable packaging film according to claim 23, wherein the package further comprises a comminuted product.

25. A peelable packaging film comprising:
   a) a first monolayer heat shrinkable thermoplastic substrate comprising a first surface and a second surface;
   b) a second non-heat shrinkable thermoplastic substrate comprising a first surface on a first surface layer and a second surface, wherein both first surfaces of the first and second substrate each comprises polyethylene and has a surface energy of at least 36 dynes/cm; wherein said second thermoplastic substrate has a Heat Shrinkage value of between 0 and 10% at 102° C. in either the machine or transverse directions;
   c) a solvent-based polyether polyurethane adhesive layer contiguously disposed between the first surfaces of the substrates; and
   d) a peelable interface provided between the adhesive layer and the first surface of the first monolayer heat shrinkable thermoplastic substrate such that the peelabie interface has a peelable seal strength value of between 60 and 2,500 grams-force/in.

26. The peelable packaging film according to claim 25, wherein at least one first surface layer is biaxially oriented.

27. The peelable packaging film according to claim 25, wherein both first surface layers are oriented.

28. The peelable packaging film according to claim 25, wherein the packaging film has a Slow Rate Penetration Resistance value greater than 11 Newtons.

29. The peelable packaging film according to claim 25, wherein the packaging film has a Tear Resistance value of less than 200 grams-force at least one direction.

30. The peelable packaging film according to claim 25, wherein a second outer packaging film-layer of the peelable packaging film comprises the second surface of the second substrate.

31. The peelable packaging film according to claim 25, wherein the packaging film forms an easy-open cylindrically shaped package by folding the film onto itself to form a tubular casing comprising an outer package surface comprising the first substrate, joining the overlaying edges together lengthwise to form a longitudinal peelable seal portion and joining the tubular casing crosswise to form a first end seal portion and an opposing second end seal portion.

32. The peelable packaging film according to claim 31, wherein the package further comprises a comminuted product.

33. An easy-open package comprising the peelable packaging film according to claim 1, wherein the peelable packaging film is rolled onto itself in an overlapping manner to form a tubular casing, and the second surface of the first substrate is sealed to the second surface of the second substrate to form a non-peelable interface between the first substrate and the second substrate.

* * * * *

UNITED STATES PATENT AND TRADEMARK OFFICE
CERTIFICATE OF CORRECTION

PATENT NO.       : 8,679,604 B2                                          Page 1 of 1
APPLICATION NO.  : 12/356142
DATED            : March 25, 2014
INVENTOR(S)      : Berbert It is certified that error appears in the above-identified patent and that said Letters Patent is hereby corrected as shown below:

On the Title Page item [56],
Column 2, line 2, delete "Bomding" and insert -- Bonding" --, therefor.

In the Specification
Columns 9-10, line 18, Table -1 continued, delete "ionomner" and insert -- ionomer --, therefor.
Column 9, line 46, delete "Aldophus" and insert -- Adolphus --, therefor In the Claims
Column 16, line 51, claim 4, delete "claim" and insert -- claim 1, --, therefor.
Column 17, line 19, claim 14, delete "according" and insert -- according to --, therefor.
Column 18, line 26, claim 25, delete "peelabie" and insert -- peelable --, therefor.

Signed and Sealed this
Fourteenth Day of July, 2015

Michelle K. Lee
*Director of the United States Patent and Trademark Office*